United States Patent
Betts (10) Patent No.: US 7,623,989 B2
(45) Date of Patent: Nov. 24, 2009

(54) SYSTEM AND METHOD FOR PULSED SIGNAL DEVICE CHARACTERIZATION UTILIZING AN ADAPTIVE MATCHED FILTERBANK

(75) Inventor: Loren C. Betts, Rohnert Park, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 538 days.

(21) Appl. No.: 11/238,452

(22) Filed: Sep. 29, 2005

(65) Prior Publication Data
US 2007/0080699 A1    Apr. 12, 2007

(51) Int. Cl.
G06F 11/30 (2006.01)
(52) U.S. Cl. .................. 702/190; 702/183; 375/130
(58) Field of Classification Search ........... 702/57–58, 702/75–76, 78–79, 190, 183; 375/130–153
See application file for complete search history.

(56) References Cited

U.S. PATENT DOCUMENTS

| | | | |
|---|---|---|---|
| 4,206,323 A | | 6/1980 | Padgett et al. |
| 4,728,958 A | * | 3/1988 | Choate ..................... 342/424 |
| 5,477,227 A | * | 12/1995 | Noneman ................... 342/195 |
| 5,572,213 A | * | 11/1996 | Noneman et al. ............. 342/13 |
| 5,602,876 A | * | 2/1997 | Noneman et al. ........... 375/317 |
| 5,612,975 A | * | 3/1997 | Becker et al. ............... 375/319 |
| 6,384,773 B1 | * | 5/2002 | Martin et al. ............... 342/202 |
| 6,396,298 B1 | * | 5/2002 | Young et al. ................ 324/769 |
| 2006/0158174 A1 | | 7/2006 | Marzalek et al. |

FOREIGN PATENT DOCUMENTS

GB    2331589 A    5/1999

OTHER PUBLICATIONS

Robert E. Shoulders et al., "Pulsed Antenna Measurements with the Agilent PNA Microwave Network Analyzers," Proceedings of the Meeting and Symposium of Antenna Measurement and Techniques Association, Irvine, CA, USA, 2003, pp. 86-91.
Loren Betts et al., "Improved Techniques for High-Performance Pulsed Measurements using Microwave Vector Network Analyzers," Proceedings of Asia Pacific Microwave Conference (APMC) 2003.
Loren Betts et al., "Make Accurate Pulsed S-Parameter Measurements," Microwaves and RF, Nov. 2003, vol. 42, No. 11.

(Continued)

*Primary Examiner*—Eliseo Ramos Feliciano
*Assistant Examiner*—Mary C Baran (57) ABSTRACT

A test system and method which employs a filter bank to select different spectral components of a pulsed measurement signal. The filter bank utilizes filter nulls to suppress non-selected spectral components. After filtering the selected spectral components, the spectral components are combined to provide for a measurement signal which is analyzed to determine characteristics of a device being tested. The characteristics of the filters can be adjusted in response to a change in the characteristics of a pulsed signal applied to the device under test, so that the selected spectral components will correspond to desired spectral components generated by the pulsed signal applied to the device under test.

18 Claims, 11 Drawing Sheets

OTHER PUBLICATIONS

David Vondran, "Techniques for Pulsed S-Parameter Measurements," High Frequency Electronics, Mar. 2003, pp. 50-57.

5989-0563EN "PNA Microwave Network Analyzers, Accurate Pulsed Measurements," Application Note 1408-11, Agilent Technologies, Inc., Feb. 17, 2004, pp. 1-16.

5989-0221EN "Pulsed Antenna Measurements Using PNA Network Analyzers," White Paper, Agilent Technologies, Inc., Jan. 6, 2004, pp. 1-12.

5988-7989EN "Agilent PNA Series Microwave Network Analyzers, Configuration Guide," Agilent Technologies, Inc., Feb. 1, 2004, pp. 1-28.

Pending U.S. Appl. No. 10/883,100, "Pulsed Signal Device Characterization Employing Adaptive Nulling and IF Gating," filed Jun. 30, 2004.

* cited by examiner

SYSTEM AND METHOD FOR PULSED SIGNAL DEVICE CHARACTERIZATION UTILIZING AN ADAPTIVE MATCHED FILTERBANK

BACKGROUND

Vector network analyzers (VNA) have in the past been used to measure the continuous wave (CW) S-parameter performance of devices being tested. Typically the CW signal will be a radio frequency (RF) signal in the range of 500 MHz to 50 GHz, but this range can vary. Often under these normal operating conditions the VNA is functioning as a narrowband measurement instrument, where the VNA applies a known RF signal to the device under test and measures the RF frequency response. If one were to look at the response of a single CW frequency one would see a single spectral tone in the frequency domain. Typically a VNA analyzer has a built in source and receiver which are designed to operate together in a synchronous manner, utilizing narrowband detection, to measure the frequency response of the device under test (DUT). Most analyzers can be configured to generate a frequency sweep over many different frequency ranges.

In some cases the signal applied to the DUT must be pulsed (turned on and off) at a specific rate (sometimes referred to as the pulsed repetition frequency (prf)) and duration. If one were to look at the frequency domain response of a single pulsed tone, it would contain an infinite number of spectral tones making it challenging to utilize a standard narrowband analyzer.

Figure 1A:
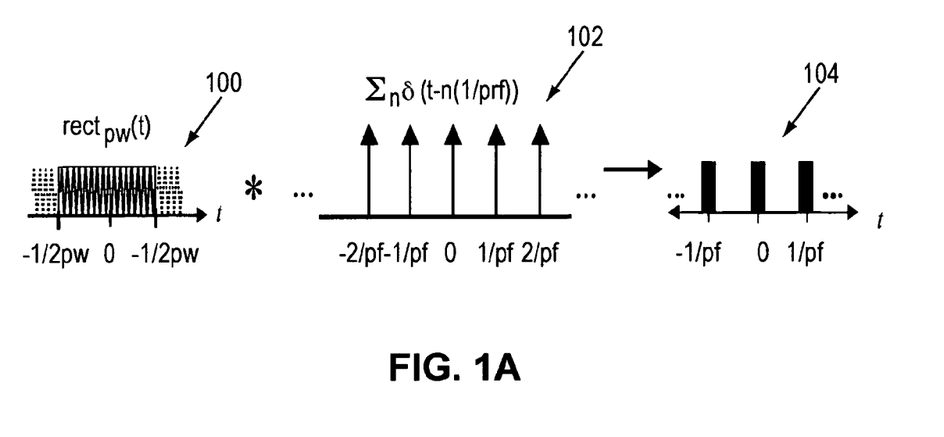
FIGS. 1A-1C illustrates a relationship between a depiction of a pulsed signal in the frequency domain, and a depiction of a pulsed signal in the time domain.

For example, a single pulsed tone that results from toggling a sine wave x(t) on and off is illustrated as 100 in FIG. 1A. This single pulsed tone 100 is expressed as rectpw(t)·x(t). The single pulsed tone 100 may be convolved with the following series function:

$$shah\frac{1}{prf}(t)$$

illustrated as 102 in FIG. 1A to obtain a pulsed signal y(t), illustrated as 104 in FIG. 1A. This convolution is expressed by the equation:

$$y(t) = (rect_{pw}(t) \ast x(t)) \ast shah\frac{1}{prf}(t).$$

Figure 1B:
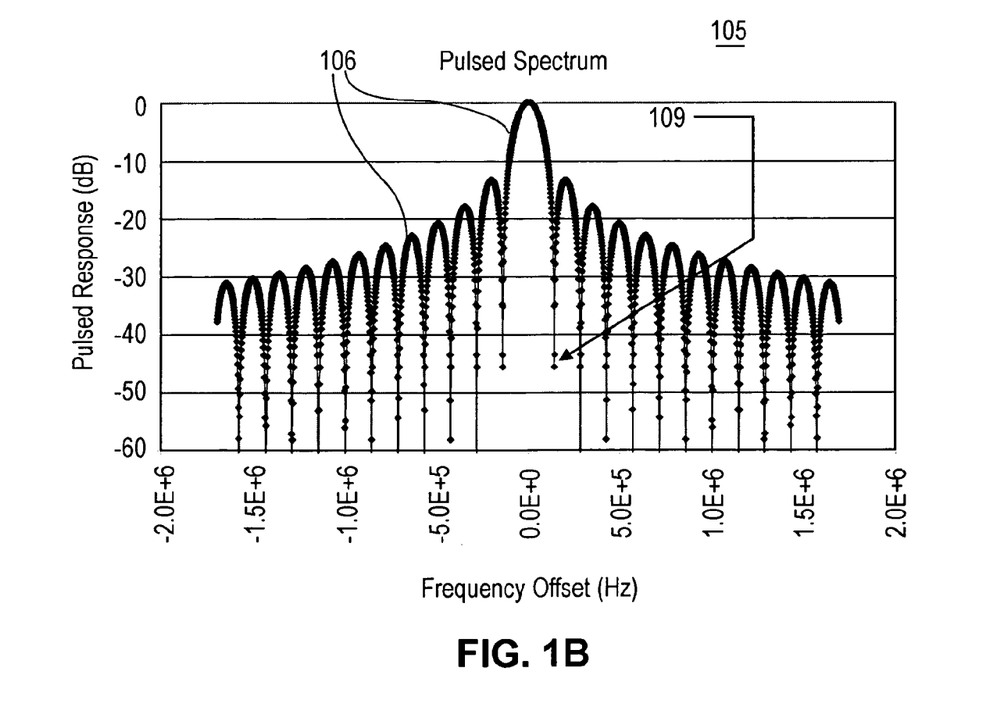
Figure 1C:
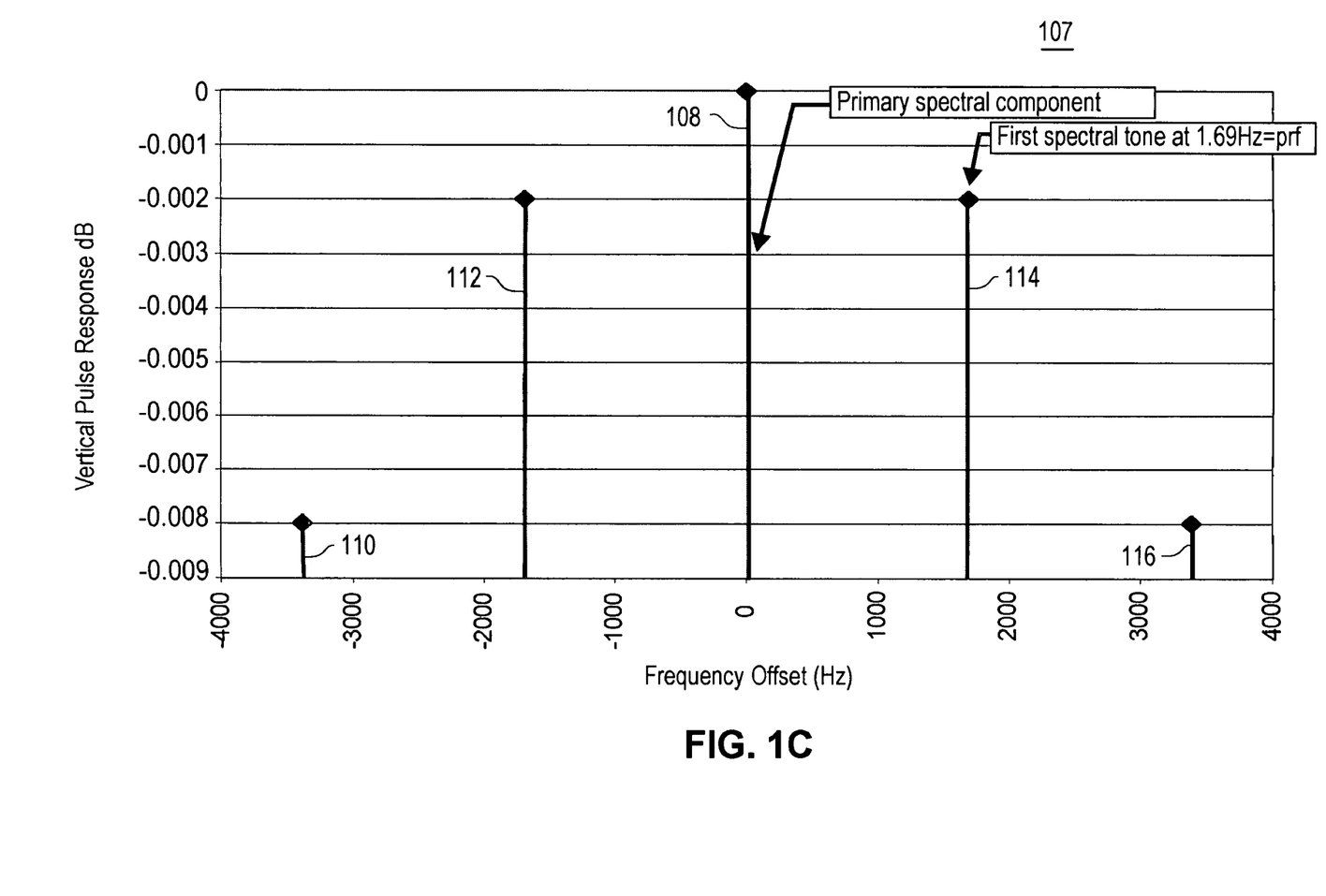

FIGS. 1B and 1C provide further illustration of the spectral components of a pulsed RF signal in the frequency domain. Specifically, FIG. 1B shows a graph 105 of a signal 106 which shows a broad spectrum of the spectral components in the pulsed RF signal. The pulsed RF signal in the frequency domain 106 shows minimum points 109 in the spectral components at a spacing of the 1/pulse width). FIG. 1C shows a much higher resolution graph 107 of the spectral components surrounding the primary spectral component 108, where the primary spectral component is at the frequency of the RF signal, which is generated by an oscillator and then the output of the oscillator is typically toggled on and off to provide a pulsed RF signal. Additional spectral components are then offset by the pulsed repetition frequency (prf) (the frequency at which the RF signal is turned on and off). In the case of FIG. 1C the prf is approximately 1.69 KHz. The different spectral components 110, 112, 114, and 116 are then offset from the primary spectral component by a frequency amount equal to an integer multiple of the prf.

In some applications pulsed signal device characterization can use adaptive filter nulling and filter gating to isolate the primary spectral component which corresponds to the RF frequency of the RF signal which is being toggled on and off to provide the pulsed RF signal. One example of such an application is provided in the pending U.S. patent application Ser. No. 10/883,100, entitled PULSED SIGNAL DEVICE CHARACTERIZATION EMPLOYING ADAPTIVE NULLING AND IF GATING which is assigned to the same assignee as the present application, and which is incorporated herein by reference in its entirety. It will be recognized that in general the primary spectral component can correspond to an intermediate frequency (IF) which results from a receiver channel of the VNA down converting the RF sinusoid of the pulsed signal after it has been incident upon the device under test.

A filtering technique which uses adaptive filter nulling and gating to exclude spectral components other than those corresponding with the primary spectral component or the corresponding IF can, however, result in a loss of energy from the original measurement signal which is received from the DUT. Generally this loss of energy is proportional to the duty cycle of the pulsed RF signal due to the filter rejecting everything except the fundamental tone (the frequency of the RF signal which is pulsed on and off) of the pulsed signal. As the duty cycle decreases, more energy moves into the sidebands and less energy remains in the primary spectral component. This is because the magnitude of the sideband spectral components in the frequency domain are inversely proportional to the product of the pulse width (PW) and the pulse repetition frequency (i.e. Duty Cycle=(PW×PRF)). Thus, where adaptive filter nulling and gating is used, the duty cycle can have a direct effect on the measurement dynamic range since the processed signal energy is reduced when the duty cycle is decreased. This loss in processed signal energy is especially problematic for signals pulsed at very low duty cycles such as required in isothermal measurements and device characterization techniques. In some cases such measurement results are unusable because of the lack of system dynamic range.

DETAILED DESCRIPTION

An embodiment of the invention provides a measurement system with good dynamic range when measuring pulsed signals with low duty cycles. The system includes a signal source that provides a pulsed RF signal to a device under test, a filter bank that receives a responding signal from the device under test and filters the responding signal to provide a plurality of spectral components, an accumulator that combines these spectral components into a combined signal, and an analyzer that analyzes the combined signal to determine a characteristic of the device under test.

Figure 2:
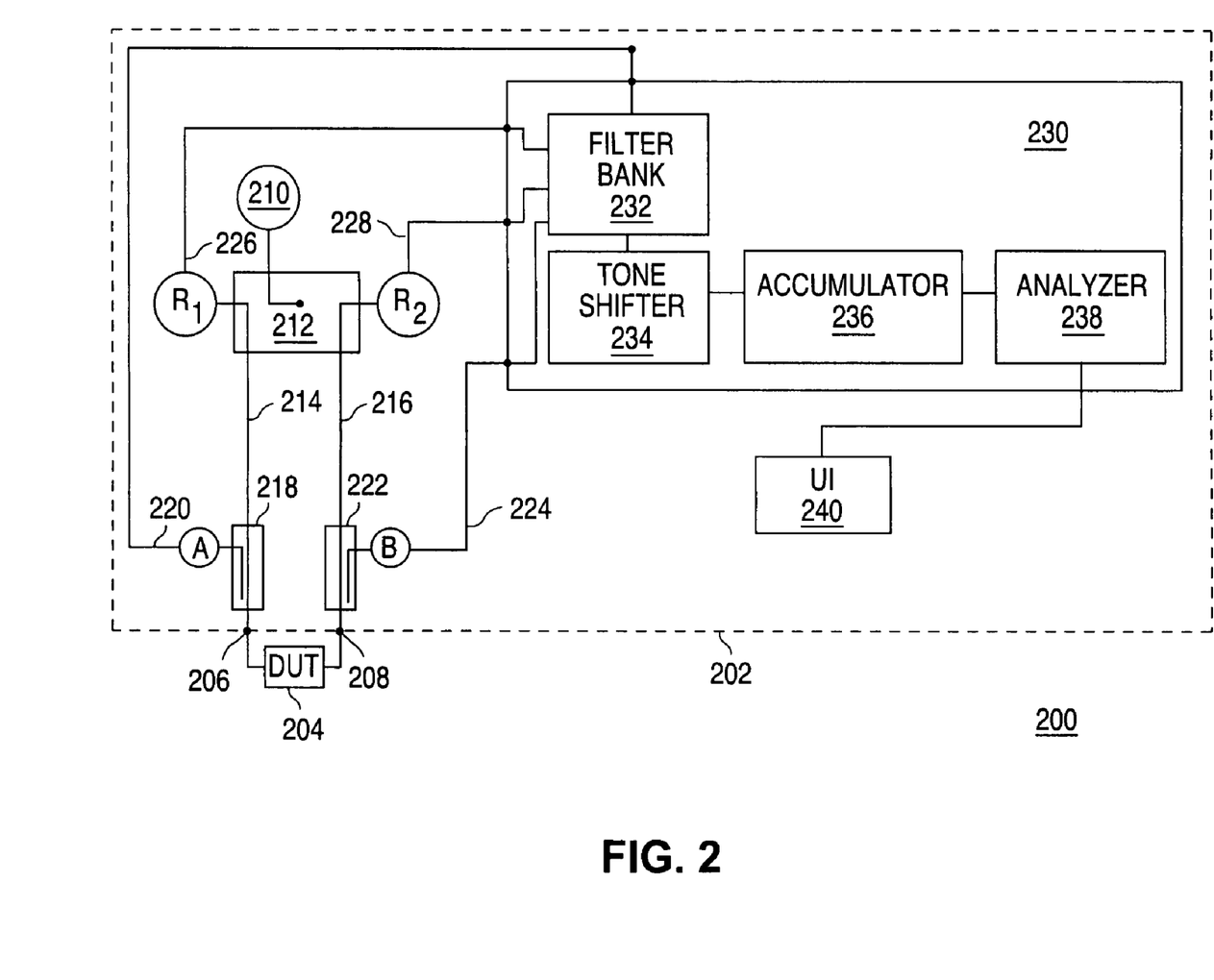
FIG. 2 is a block diagram illustrating an embodiment of the invention.

FIG. 2 illustrates an exemplary embodiment of a system 200 herein. The system provides for a VNA 202, which has ports 206 and 208 to which a device under test 204 can be connected. The VNA 202 includes an RF source 210, and the source will generally be able to provide a CW output signal, and alternatively the CW output signal can be pulsed on and off, to provide different pulse widths of the CW signal, at different pulse repetition frequencies. A switch 212 can then route the RF signal output by the source 210 to a channel 214 corresponding to the port 206 of the analyzer 202, or the switch 212 can route the output of the source to a channel 216 to the port 208 of the VNA. The channel 214 includes a coupler 218 which has an A output coupler path 220. The A output path 220 operates to capture a portion of a signal transmitted from port 206 toward the source 210. This signal transmitted from the port 206 toward the source is a measurement signal, which could correspond to a portion of the RF signal from the source which is reflected back from an input to the device 204, or the measurement signal on the A output path 220 could correspond to a signal being transmitted from the source 210 through the port 208, through the DUT 204, and then through port 206. Correspondingly channel 216 includes a coupler 222 which has a B output coupler path 224, which operates to captures signals transmitted through, or reflected off of, the DUT 204.

In addition to the measurement channels 220 and 224 which contain signals from the device under test 204. The VNA analyzer 202 also includes a R1 reference channel 226 and a R2 reference channel 228. By comparing the signal received in reference channels against a signal received in one of the measurement channels 220 or 224, characteristics of the performance of the DUT 204 can be determined. In many instances network analyzers are used to determine S parameters for a DUT. S parameters (S11, S12, S21 and S22) can be used for example to provide information regarding the reflective and transmissive properties of the DUT 204.

In the system 200 each of the reference channels 226 and 228, and each of the measurement channels 220 and 224 are input to a receiver module 230 which processes the signals input from the measurement channels and reference channels.

The receiver 230 can be implemented in numerous different ways, and can include a number of different components. Typically, the receiver module in a network analyzer will include a mixer which operates to down convert the relatively high frequency RF signal output by the source 210. The primary spectral component of the RF signal will be converted to an IF signal, which corresponds to the RF frequency of the source 210. In a pulsed mode of operation the signal output by the source 210 will include many other spectral components surrounding the RF frequency. Thus, the conversion to the IF will also provide a number of down converted spectral components surrounding the IF.

In one embodiment, after the signals from the channels 220-228 have been down converted, the receiver module 230 will then provide an ADC (analog to digital converter) for digitizing the signals. After the signal has been digitized, different elements of the receiver operate to process the signals as described in more detail below. It should be noted that while some of the exemplary implementations discussed herein contemplate using primarily a digital processing scheme, there are of course analog approaches which could be used to achieve the same or equivalent results.

In one embodiment the receiver module 230 can include a single programmed processor for implementing different processing methods as described herein. In other embodiments the receiver module can include a number of different interconnected processing modules such as programmable gate arrays, ASICs and general purpose processors. In general the receiver module 230 will include a filter bank module 232 which operates to provide a plurality of different filtering functions to the input signals. These different filtering functions operate to select different spectral components of the measurement signals and reference signals. After the filter bank module 232 has processed the input signals, a tone shifter module 234 operates to shift the plurality of different spectral components to a frequency corresponding to the RF frequency of the pulsed signal from the source 210. Additionally, the tone shifting module 234 can operate to align the phases of each of the plurality of different spectral components. The output to the tone shifter module 234 is then transmitted to an accumulator module 236 which operates to combine the plurality of different spectral components. The processed signals corresponding to each of the different measurement and reference channels input to the receiver are used by an analyzer module 238 to determine characteristics of the device under test. These determined characteristics can then be presented to a user via a user interface 240 of the VNA analyzer 202. The user interface can include for example a flat panel display or a printer. Additionally a user interface of a network analyzer will typically include a keyboard and various other input devices whereby a user can control different operations of the VNA.

Figure 3:
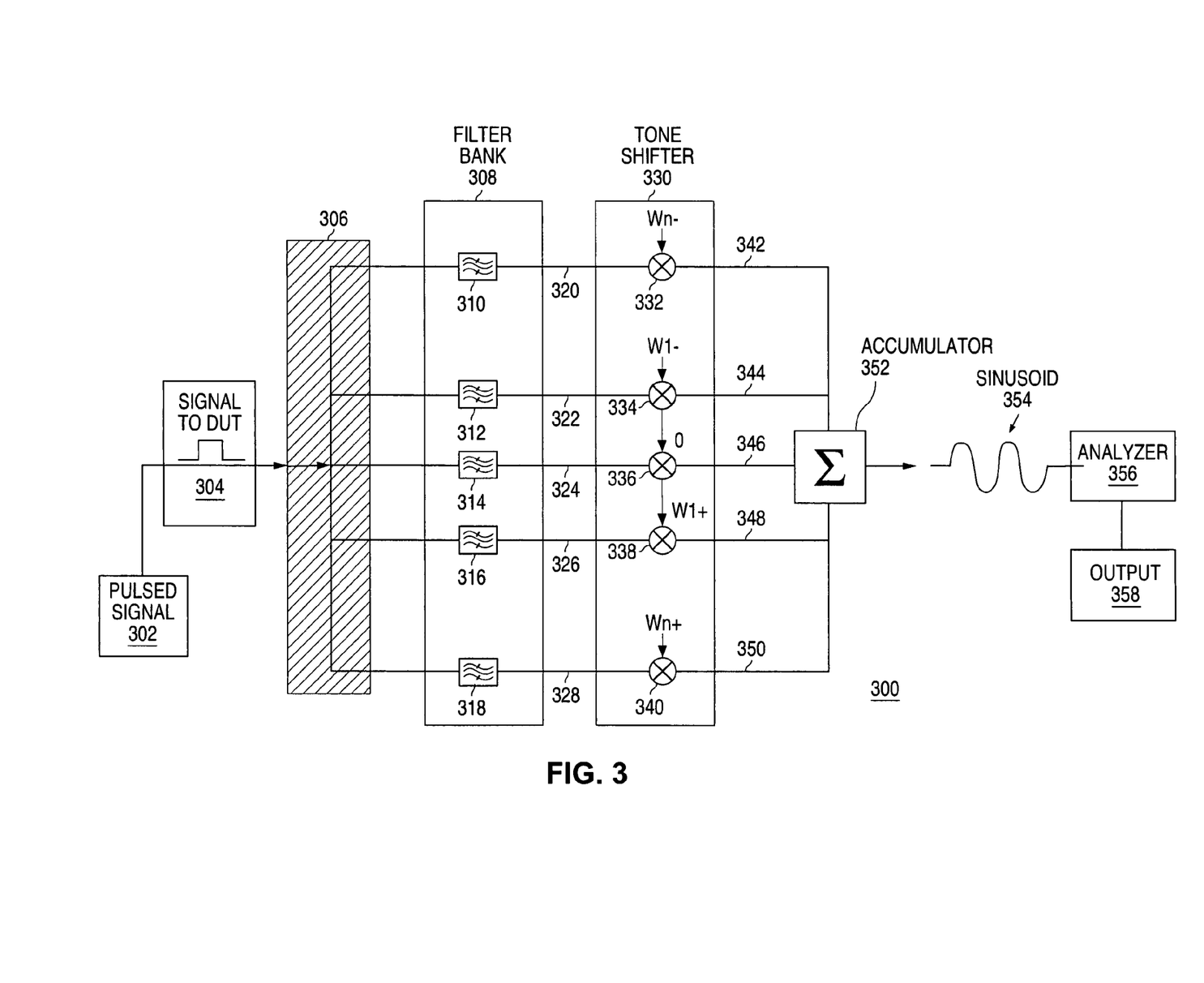
FIG. 3 is a diagram illustrating an embodiment of a method herein which provides for utilizing a plurality of filter functions in a filter bank to select and process a plurality of different spectral components.

An embodiment of the invention provides a method 300, such as that illustrated by FIG. 3, with good dynamic range when measuring pulsed signals with low duty cycles. The method includes generating a pulsed signal 302 and applying a pulsed signal 304 to a device under test. A measurement signal from the device under test is then received. The measurement signal is then filtered to select a plurality of different spectral components of the responding signal. The different spectral components are then used to form a combined signal. The combined signal is then analyzed to determine a characteristic of the device under test.

Depending on the source used in the system, the RF frequency of the pulsed RF signal can vary across a wide range of different frequencies. In one embodiment the range could be from a few Megahertz up to 50 GHz or higher. The prf rate of the pulsed RF signal can also be varied over significant range, but in many applications the prf will be in the range of 1-5 kHz.

After the pulsed RF signal is applied to the DUT, a measurement signal is received 306 by the processing elements of the system. The measurement signal corresponds to the pulsed RF signal which has either been transmitted through the DUT, or reflected off of the input to the DUT. Additionally, the processing elements of the system will also receive reference input signals as described above.

In one embodiment, initially, the measurement signal from the A channel would be down converted and digitized at 306, and such a converted and digitized signal would still in effect be the measurement signal. Then this digitized signal would be processed according the different filtering functions provided by a bank of digital filtering modules 308. For example, this discussion contemplates the filtering and processing of a measurement signal received on the A measurement channel 220 of the VNA 202, but an analogous processing operation would be performed on the signals received on the other measurement and reference signals input to the processor of the VNA.

The filtering of the measurement signal utilizes a filter bank 308 which operates to apply different filtering functions 310-318 . . . N, where these filtering functions are implemented to select a plurality of different spectral components of the measurement signal, and the characteristics of the filtering functions are determined based on the prf of the pulsed signal, and the RF frequency of the pulsed signal.

An embodiment of the present system which utilizes a digital filter bank operation, can provide for improved dynamic range, over a system which utilizes a filtering scheme that relies on adaptive filter nulling alone. The filter bank 308 operation provides a series of matched nulling filters, or filter functions, where the characteristics of each of the filter functions are determined based on the prf and RF frequency, of the pulsed RF signal, and the outputs of the filter functions are combined to capture not only the IF (the down converted signal corresponding to the RF frequency) but also the side band spectral components generated by pulsing. Each spectral component contains relevant information pertaining to the measurement. The filtered signals 320-328 output from each of the filtering functions, are then processed using different tone shifting functions 332-340 where the tone shifting functions operate to convert each of the different filtered spectral components to the frequency corresponding to the IF frequency, and to align the phases of each of the different signals. The signals output (342-350) by the tone shifting functions are then accumulated, or combined, 352 into signal 354 which corresponds to a RF signal as reflected off of, or transmitted through, the DUT, and this signal 354 includes information from a plurality of selected spectral components of the pulsed RF signal.

Similar processing operations are provided for the RF signals on each of the reference channels and the measurement channels, which are input to receiver module of the VNA, and these processed signals are then analyzed 356 by a processor of the VNA to determine characteristics, such as S parameters, of the DUT, and the determined characteristics can then be output 358.

In the above discussed method, the output of the filter bank is applied to an accumulator, or a digital re-combiner, that correlates and accumulates the resulting signals. In one embodiment the output of the accumulator will consist of a single sinusoid that will not exhibit processed signal loss proportional to duty cycle, because the loss can be reduced by increasing the number of spectral components accumulated using the filter bank, and the accumulator. Thus, a resulting increase in dynamic range over prior techniques can be achieved. The operation of one embodiment herein provides for a type of coherency integration, where the resulting increase in coherent signal gain is 6 dB for each doubling of correlated signal energy whereas uncorrelated noise integration corresponds to only a 3 dB increase. Further, the number of filters, and the characteristics of the filters, such as the shape of each filter, can be adapted based on the characteristics of the pulsed signal. For example, a controller input which is used to control the RF frequency and prf of a pulsed RF signal can also be used to determine the parameters of the filter functions, which are applied by the filter bank.

Systems and methods embodying the invention can offer control of the dynamic range of a measurement independent of the duty cycle of a pulsed RF test signal. Specifically, the dynamic range can be improved by increasing the number of spectral components selected using multiple offset filtering functions. Thus, the relative gain in dynamic range becomes a function of not only the filter bank bandwidth (noise reduction) but also the number of digital filters in the filter bank (signal gain). Also, as one of skilled in the art of digital filter design will recognize, the independent filter coefficients and digital filter tap counts for each of the different filter functions in filter bank allows for noise selectivity across frequency. This digital filtering also provides for flexibility in coherent signal gain versus integration time.

The filter bank can be implemented using multiple adaptive nulling digital filters, where each of the adaptive nulling digital filters receives and filters its corresponding frequency component. Each of the adaptive nulling digital filters can utilize a control input to make determinations as to characteristics of the digital filters. For example, the frequency of the spectral component selected by the filter and the spacing between nulling points, of the filter function, can be determined based on the characteristics of the pulsed RF signal input to the DUT. As used herein, a 'null' generally refers to points within the filter frequency response having relatively high attenuation when compared with a pass or transmission band portion of the frequency response.

In some embodiments, the nulls are adjusted to correspond to frequency locations of unwanted or undesirable signal components or harmonics in the measurement or reference signals. The frequency correspondence between the nulls and the signal harmonics may be approximate in some embodiments. Therefore, a location of a null may be referred to herein as corresponding to a vicinity of the spectral component. When so adjusted, the undesirable spectral components are attenuated, and in some cases significantly attenuated, by the nulls. As such, the adjusted, adaptive nulling digital filter function essentially removes or 'nulls' out the undesirable spectral components relative the spectral component being selected by a given filter function. In some embodiments, the nulls are adapted to a received signal based on knowing the RF frequency and the prf of the pulsed RF signal.

In some embodiments, the filter functions are finite impulse response (FIR) filters, where the frequency response of the FIR filter often is characterized by periodic nulls located on either side of a pass band. The periodically located nulls may simplify an implementation and/or reduce a complexity of the FIR filter when the periodic nulls are employed to attenuate similarly periodic signal harmonics.

In some embodiments, the filter functions can include multiple summation elements as well as feedback and feed-forward paths within the filter configuration. The embodiments of the present invention are not limited to a particular filter realization or filter topology. Details of FIR filter design, digital filter design in general, and realization, and implementation of such filters, are well known in the art and may be found in many textbooks on the subject of digital filters and/or digital signal processing, including, John G. Proakis et al., Digital Signal Processing, 2nd Edition, Macmillian Publishing Company, 1992, incorporated by reference in its entirety herein.

In some embodiments of the present invention, a FIR filter with a rectangular window response is used as the FIR filter. In other embodiments, a FIR filter having an approximately rectangular window response is used as the FIR filter. In yet other embodiments, an FIR filter having other than a rectangular or nearly rectangular window response is employed as the FIR Filter.

In practice, the filter functions may be realized in a variety of ways, depending on a particular implementation and application of the receiver channel. For example, the filter could be realized as a circuit, or a portion of a discrete or integrated digital circuit, such as, but not limited to, a circuit of a field programmable gate array (FPGA) or a circuit in an application specific integrated circuit (ASIC). Alternatively, the filter functions can be provided by a signal processor circuit or system, or as a function/subroutine of a computer program executed by a general purpose processor, such as a microprocessor.

Figure 4A:
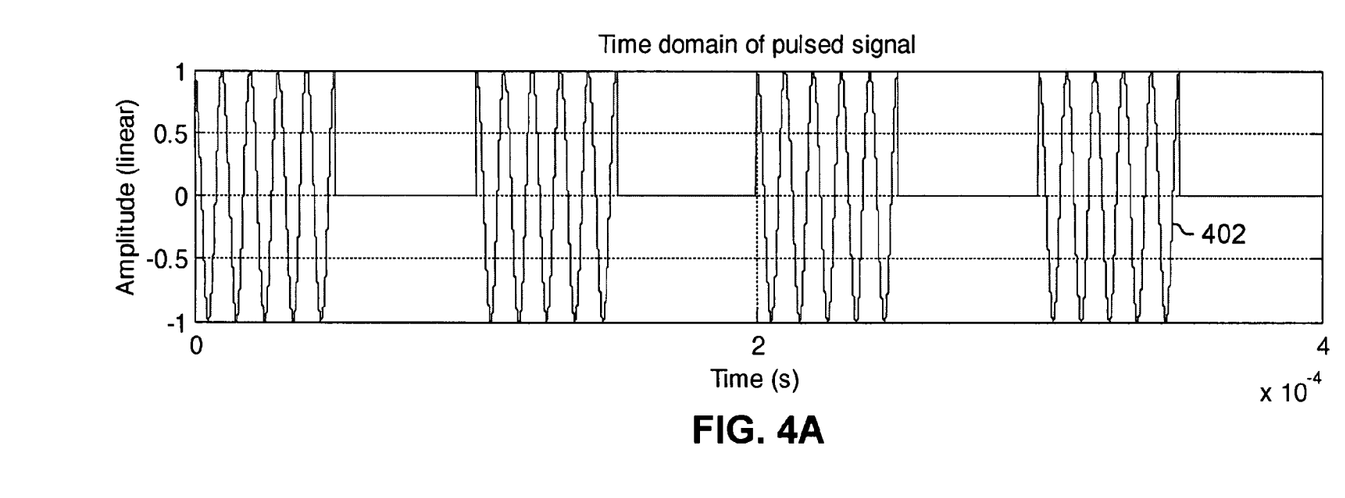
FIGS. 4A-4C are graphs which show a pulsed input signal in the time domain, and in the frequency domain, and illustrate a plurality of different filtering functions used to select different spectral components.

FIG. 4A illustrates a pulsed RF signal 402 in the time domain. The pulsed RF signal has a time period when the RF signal is on and it is generating a signal at an RF frequency, and the pulsed RF signal has time period when it is off. The rate at which the pulse is turned on and off corresponds to the prf as described above. The pulsed sinusoid in the frequency domain contains many spectral component sidebands. Each spectral sideband component, or selected spectral sideband components can have an associated filter function in the filter bank. Note that the highest tone, or largest amplitude signal, 404 shown in FIG. 4B (corresponds to the IF frequency) in the frequency domain shows the IF having an amplitude of ½ which is the same as the duty cycle in this example, as compared with the pulsed signal in the time domain which has a peak value of 1. In such a situation an adaptive nulling technique, with a single filter function can result in a 50% decrease in processed signal energy, whereas the multiple filter function approach can provide for much smaller percentage decreases in the processed signal energy.

Figure 4B:
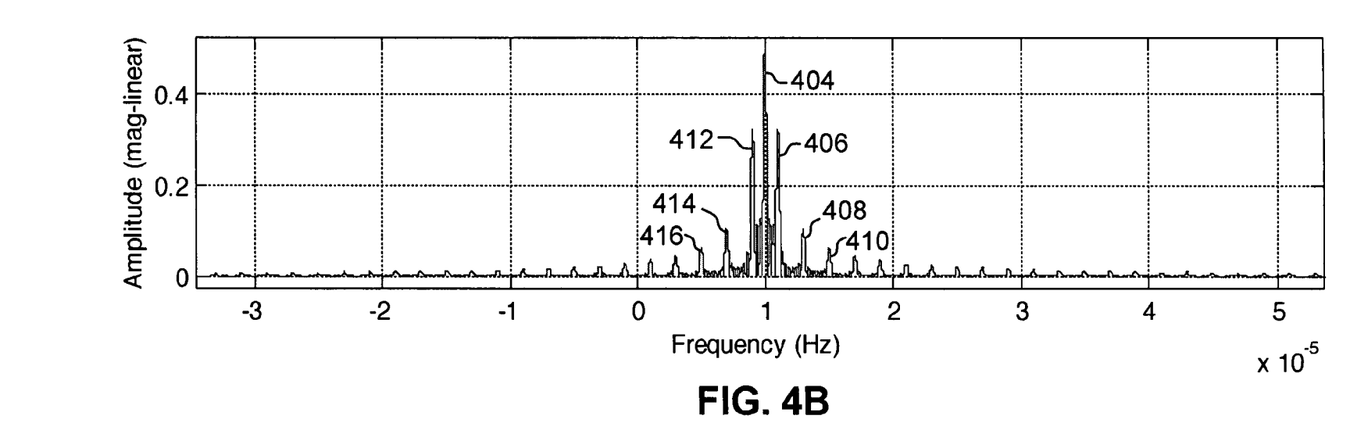

FIG. 4B illustrates the pulsed RF signal from FIG. 4A in the frequency domain. As mentioned above the spectral component 404 corresponds to the spectral component of the RF frequency. FIG. 4B further illustrates numerous additional side band spectral components 406-416 . . . N. These spectral components are the result of the pulsing of the RF signal.

Figure 4C:
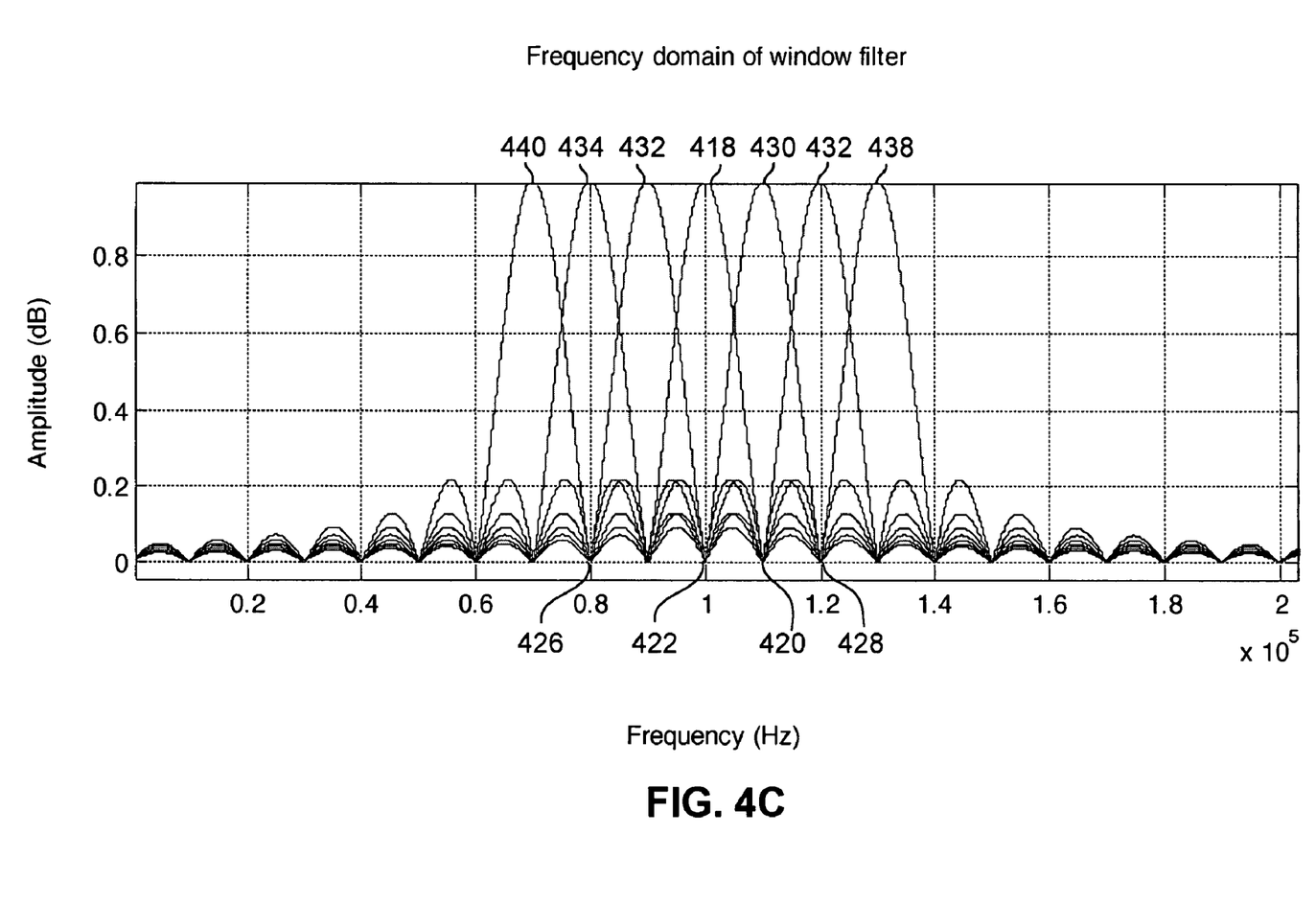

FIG. 4C provides an illustration of the filtering functions, in the frequency domain, provided by a filter bank of an embodiment of the present invention. It should be noted that the scales on the various graphs of FIGS. 4A-4C are provided for illustrative purposes. Element 418 provides a first filtering function. The filtering function 418 provides for selecting a frequency which corresponds to the RF frequency, which is shown in FIG. 4B as spectral component 404. This selected frequency could be the RF frequency, or an IF frequency which corresponds to the RF Frequency. The filtering function 418 further provides for a series of null points 420-428 . . . n, in the filtering function. These null points are points where the filtering function operates to filter out most of the energy found at the frequency which corresponds to the given null point. The filtering function is adapted to space each of the null points at a frequency offset from the pass frequency by an amount equal to the prf. Thus, the filtering function 418 will operate to select the frequency component 404, shown in FIG. 4B, and to reject or null the frequency components 406-416 which are offset from the RF spectral component by an amount corresponding to the prf. Thus, as illustrated by FIGS. 4A-4C each filter function is aligned with an incoming spectral component and is matched to the pulsed signal, thereby nulling out other spectral components. Each filter function in the filter bank can be independent of the other and can have its own complex weighting factors and tap counts.

For example, the filtering function 430 of FIG. 4C will operate to select the spectral component 406 of FIG. 4B and reject through the nulling of the filtering function 430 the other spectral components shown in FIG. 4B. The other filtering functions 432-440 will then operate in a similar manner to select corresponding spectral components and reject other spectral components.

Figure 5A:
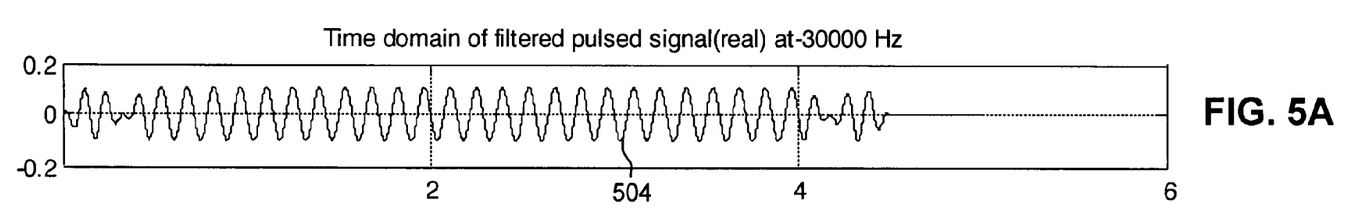
FIGS. 5A-5G are graphs which show the signals output by a filter bank in an exemplary embodiment herein.
Figure 5B:
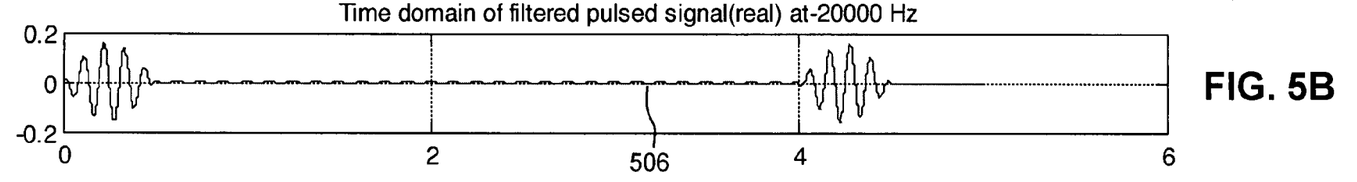
Figure 5C:
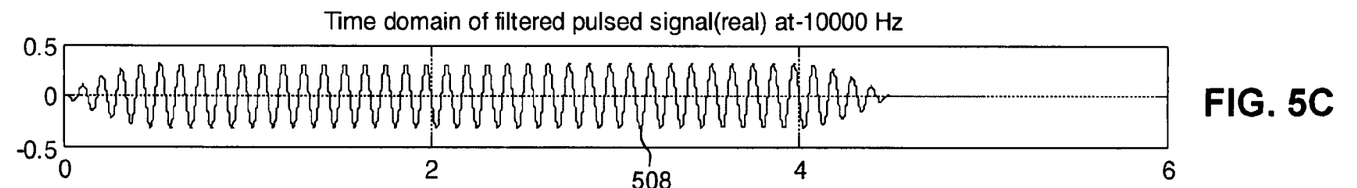
Figure 5D:
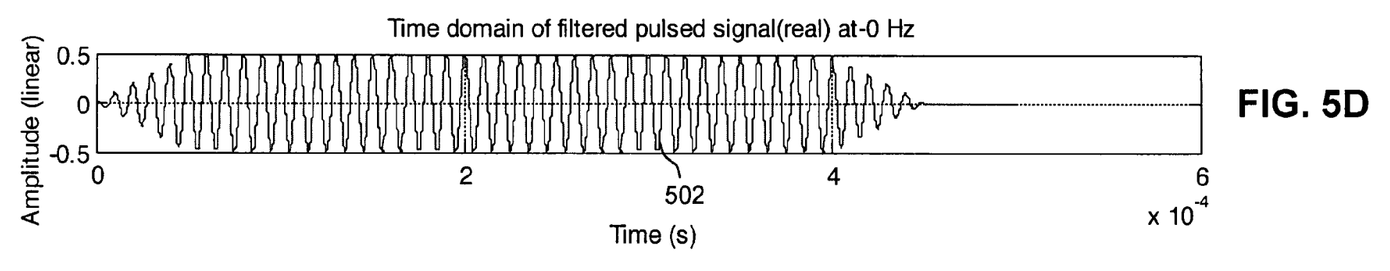
Figure 5E:
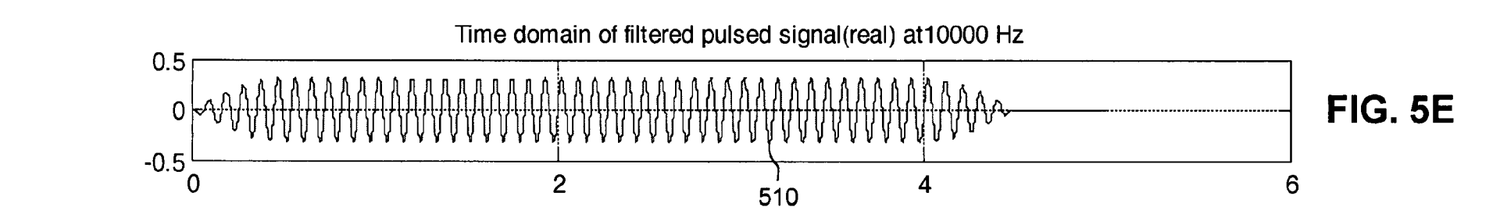
Figure 5F:
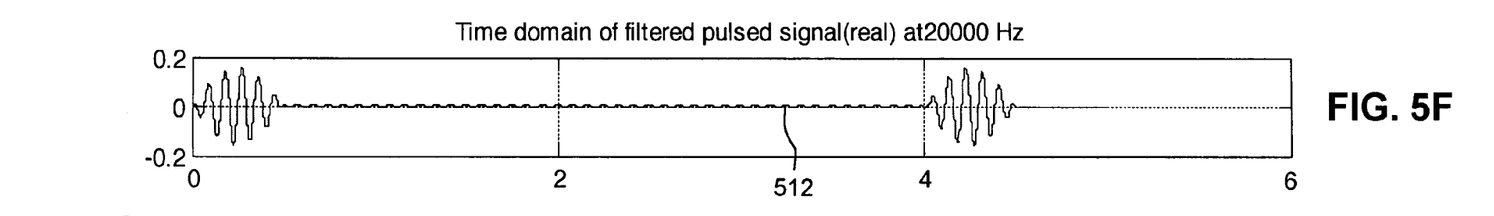
Figure 5G:
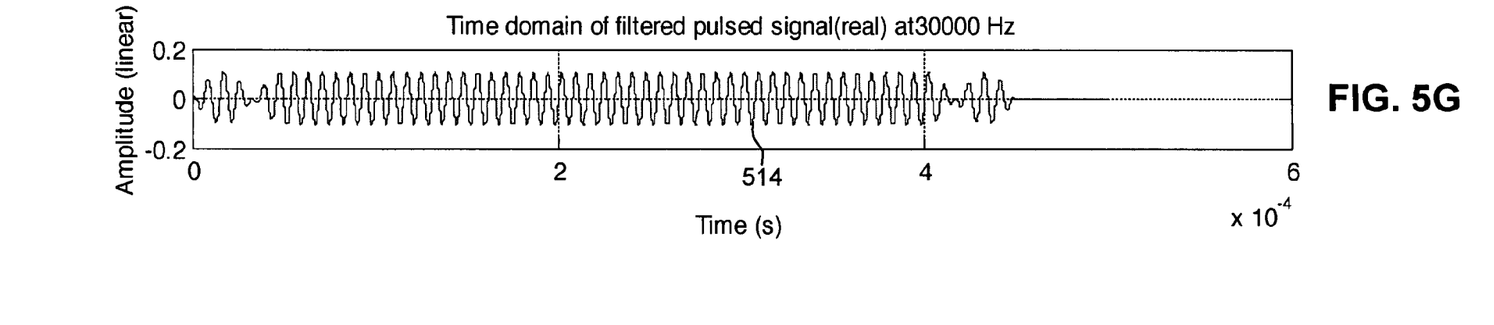
Figure 6A:
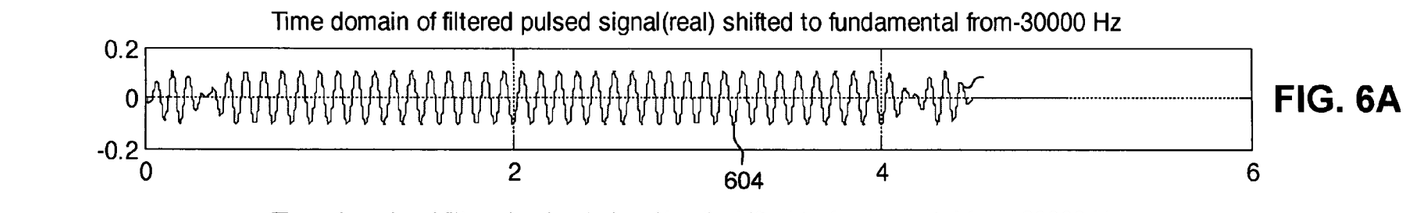
FIGS. 6A-6G are graphs which show tone shifted signals output by a tone shifter in an exemplary embodiment herein.
Figure 6B:
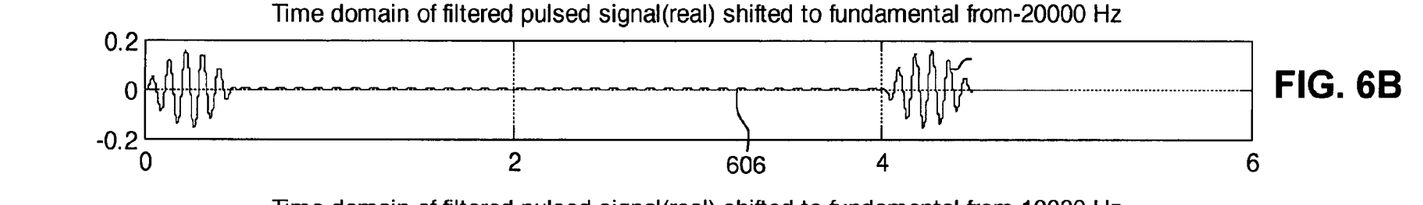
Figure 6C:
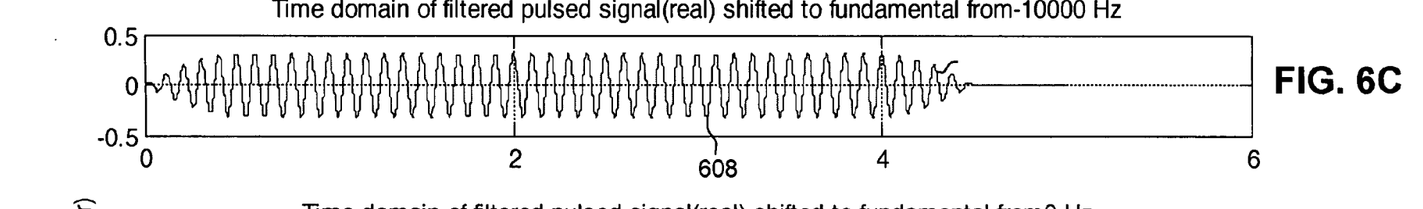
Figure 6D:
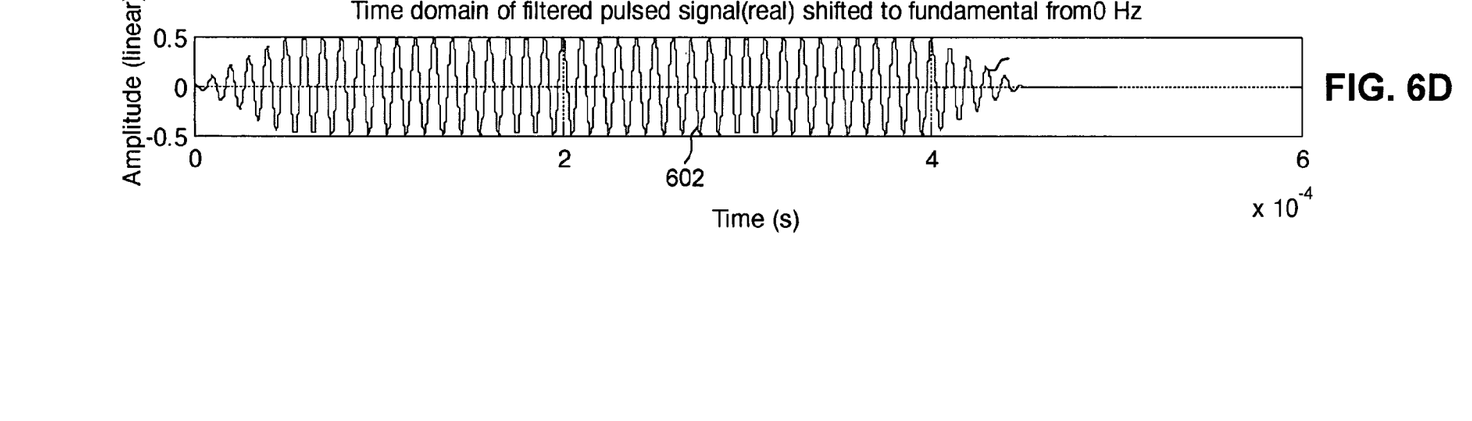
Figure 6E:
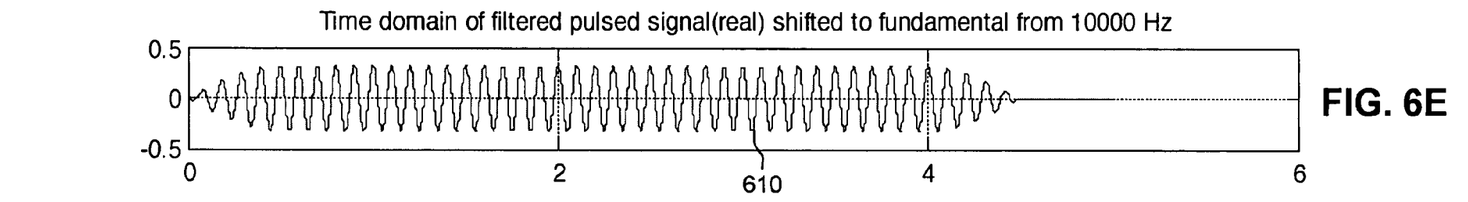
Figure 6F:
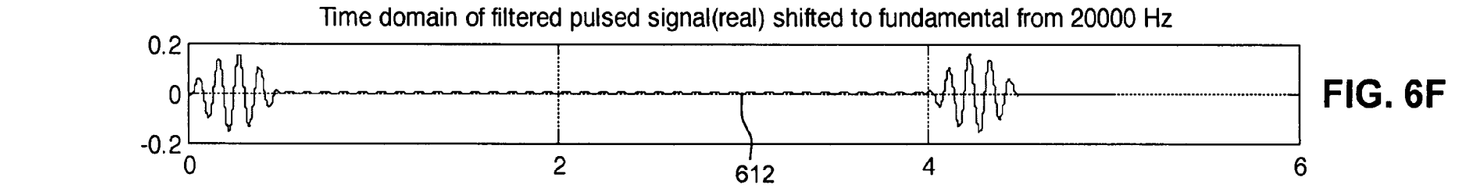
Figure 6G:
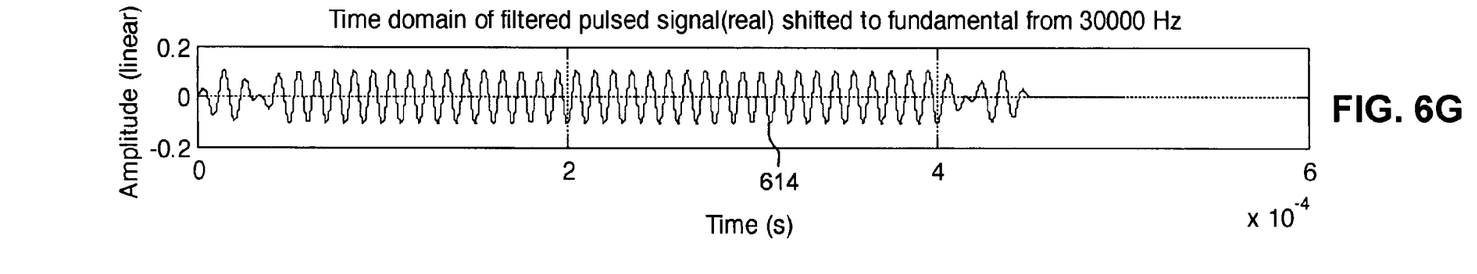

FIGS. 5A-5G illustrate the output signals from each of the different filtering functions shown in FIG. 4C. The filter bank output consists of a series of sinusoids all at different frequencies. FIG. 5D shows the signal 502 corresponding to the IF of the RF frequency of the RF pulsed signal, which would be output from a center filtering function such as filtering function 418 of FIG. 4C. The IF frequency amplitude illustrates the loss (½) in signal energy proportional to the duty cycle (½). The other output signals 504, 506 and 508 shown in FIGS. 5A-5C, and 510, 512 and 514 shown in FIGS. 5E-5G would then correspond to the output of the other filtering functions 430-440 of FIG. 4C. It is worth noting that a DUT which is being tested would typically have different effects on the different spectral components of the pulsed RF signal. For example, consider FIGS. 5B and 5F which show output signals 506 and 512 where the DUT has the effect of strongly attenuating these spectral components.

FIGS. 6A-6G illustrate the effect of the operation of the tone shifting functions which are applied to the output signals shown in FIGS. 5A-5G. As shown in FIGS. 6A-6G the tone shifting function operates to adjust and align the phase of each of the output signals shown in FIGS. 5A-5G so that the tone shifted output signals 602-614 are at a frequency which corresponds to the IF frequency of the RF frequency. The tone shifting functions also operate to align the phases of the tone shifted output signals 602-614. In operation each one of the resulting sinusoids from the filter bank are mixed with a complex value mixing coefficient 'w' such that their resulting frequency and phase are correlated. In some embodiments the IF frequency response of the hardware of the VNA needs to be taken into account. In such instances an IF frequency response calibration could be applied as a correction factor to the complex mixing coefficients.

Figure 7A:
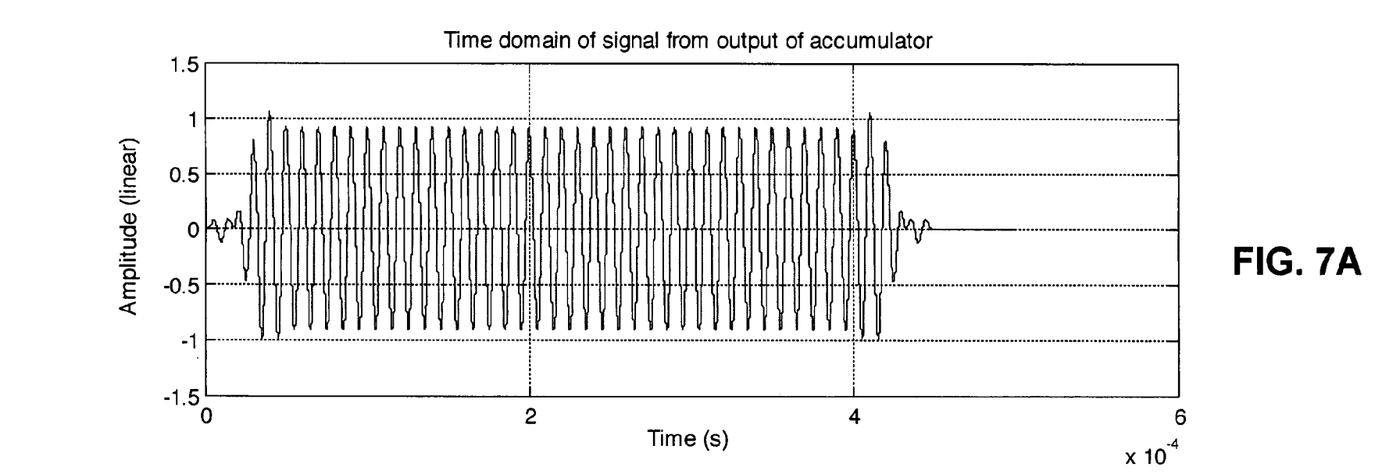
FIGS. 7A-7B are graphs which show a signal, in both the time domain and frequency domain, as output by an accumulator in an embodiment herein.
Figure 7B:
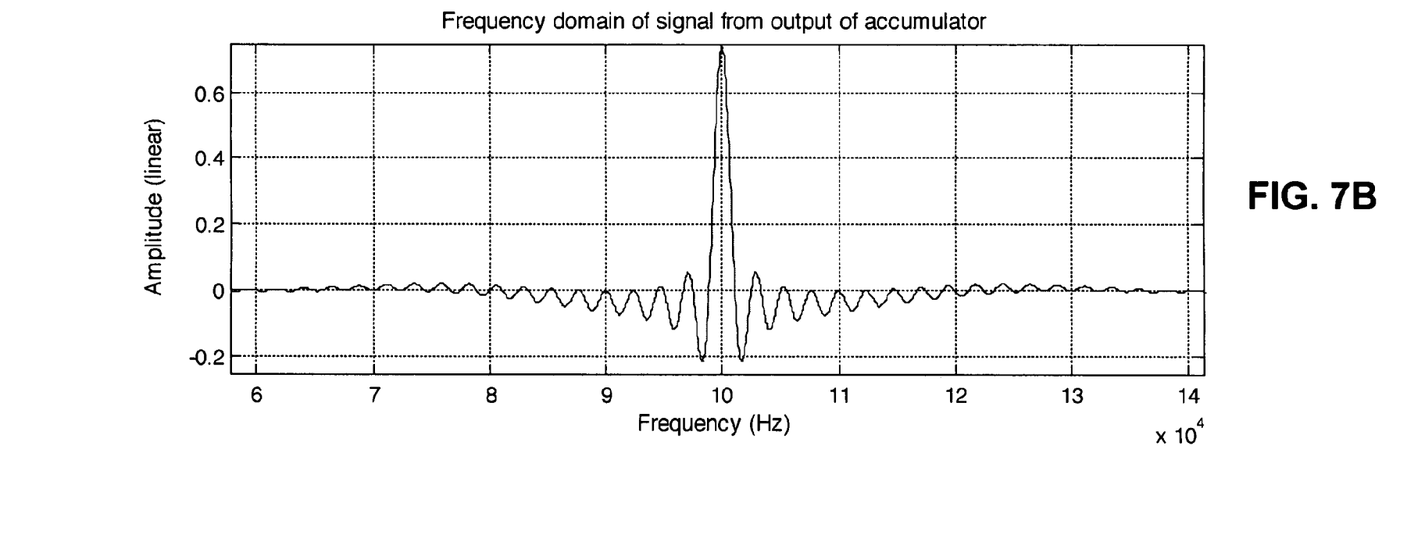

The tone shifted signals 602-614 of FIGS. 6A-6G are then transmitted from the tone shifter to the accumulator which operates to combine signals. Generally, this operation of the accumulator includes the integration of a tone shifted signals from the tone shifter, and provides a single sinusoid as shown in FIG. 7A whose resulting amplitude closely matches the amplitude of the original sinusoid which was pulsed on and off in the pulsed RF signal which was applied to the DUT. FIG. 7B shows the signal of FIG. 7A in the frequency domain. This capturing of multiple spectral component reduces much of the signal loss which would have occurred in a prior system, where the loss would have been proportional to the duty cycle, and the resulting combined signal is then analyzed, to determine the characteristics of the DUT. This same processing technique as described above can be used for all of the measurement signals and reference signals input to the receive module, and the processed signals are then used by the analyzer module to determine the characteristics of the device under test.

Although only specific embodiments of the present invention are shown and described herein, the invention is not to be limited by these embodiments. Rather, the scope of the invention is to be defined by these descriptions taken together with the attached claims and their equivalents.

What is claimed is:

1. A method of operating a measurement system to analyze a device, the method comprising:

applying a pulsed signal to the device;
receiving a measurement signal which corresponds to the pulsed signal after it the measurement signal has been applied to the device;
filtering the measurement signal to select a plurality of different spectral components of the measurement signal;
combining the plurality of different spectral components to form a combined signal; and
analyzing the combined signal to determine a characteristic of the device.

2. The method of claim 1, wherein the pulsed signal is characterized by a RF frequency and a pulse repetition rate, and wherein the filtering of the measurement signal is such that a first spectral component of the plurality of spectral components selected corresponds to the RF frequency.

3. The method of claim 1 wherein the combining of the spectral components includes adding each of the different spectral components.

4. The method of claim 1 wherein the pulsed signal is a pulsed RF signal having an RF frequency; and wherein the filtering of the measurement signal, includes controlling the filtering so that a filtering function is provided which selects a spectral component at the RF frequency, and provides for filtering nulls corresponding to other spectral frequency components of the measurement signal.

5. A method of operating a measurement system to analyze a device, the method comprising:
applying a pulsed signal to the device;
receiving a measurement signal which corresponds to the pulsed signal after the measurement signal has been applied to the device;
filtering the measurement signal to select a plurality of different spectral components of the measurement signal;
combining the plurality of different spectral components to form a combined signal; and
analyzing the combined signal to determine a characteristic of the device;
wherein the pulsed signal is characterized by a RF frequency and a pulse repetition rate, and wherein the filtering of the measurement signal is such that a first spectral component selected corresponds to the RF frequency, and such that a second spectral component selected corresponds to the RF frequency plus a first integer multiple of the pulse rate frequency.

6. A method of operating a measurement system to analyze a device, the method comprising:
applying a pulsed signal to the device;
receiving a measurement signal which corresponds to the pulsed signal after the measurement signal has been applied to the device;
filtering the measurement signal to select a plurality of different spectral components of the measurement signal;
combining the plurality of different spectral components to form a combined signal; and
analyzing the combined signal to determine a characteristic of the device,
wherein the pulsed signal is characterized by a RF frequency and a pulse repetition rate, and wherein the filtering of the measurement signal is such that a first spectral component of the plurality of spectral components selected corresponds to the RF frequency, and wherein the filtering further includes:
filtering the measurement signal to select a plurality of spectral components, wherein each of the selected spectral components after the first corresponds to the RF frequency plus an integer multiple of the pulse repetition frequency.

7. The method of claim 6 wherein each of the plurality of spectral components is at a different frequency, and further comprising shifting the different frequency for each of the spectral components by an amount necessary to bring each of the plurality of spectral components to a frequency which corresponds to the RF frequency, prior to combining the spectral components.

8. The method of claim 7 wherein the frequency which corresponds to the RF frequency is an IF frequency which is generated by down converting the measurement signal, and wherein the filtering is done using a digital filter bank.

9. A method of operating a measurement system to analyze a device, the method comprising:
applying a pulsed signal to the device;
receiving a measurement signal which corresponds to the pulsed signal after it has been applied to the device;
filtering the measurement signal to select a plurality of different spectral components of the measurement signal;
combining the plurality of different spectral components to form a combined signal; and
analyzing the combined signal to determine a characteristic of the device;
wherein the pulsed signal is a pulsed RF signal having an RF frequency; and wherein the filtering of the measurement signal, includes controlling the filtering so that a filtering function is provided which selects a spectral component at the RF frequency, and provides for filtering nulls corresponding to other spectral frequency components of the measurement signal, and
wherein the filtering nulls are offset by an amount corresponding to a pulse rate frequency of the pulsed signal.

10. A test system comprising:
a signal source that provides a pulsed signal characterized by an RF frequency and a pulse repetition rate to a device under test;
a filter bank that receives a measurement signal from the device under test and filters the measurement signal to provide a plurality of spectral components;
an accumulator that combines the spectral components into a combined signal; and
an analyzer that analyzes the combined signal to determine a characteristic of the device under test.

11. The test system of claim 10 wherein one of the plurality of spectral components corresponds with the RF frequency.

12. The test system of claim 10 wherein the accumulator operates to sum each of the spectral components.

13. The test system of claim 10, wherein the filter bank applies a plurality of different filtering functions to the measurement signal, each filtering function selecting a corresponding spectral component, each filtering function providing a plurality of filtering nulls at spectral components that do not coincide with the spectral component corresponding with that filtering function.

14. The test system of claim 13 wherein each filtering null is offset from the frequency of its corresponding spectral component by an amount corresponding to the pulse rate frequency.

15. The test system of claim 10 wherein the measurement signal received by the filter bank is a digital signal.

16. A test system comprising:
a signal source that provides a pulsed signal characterized by an RF frequency and a pulse repetition rate to a device under test;

a filter bank that receives a measurement signal from the device under test and filters the measurement signal to provide a plurality of spectral components;

an accumulator that combines the spectral components into a combined signal; and an analyzer that analyzes the combined signal to determine a characteristic of the device under test, wherein one of the plurality of spectral components corresponds with the RF frequency, and a second spectral component of the plurality of spectral components corresponds to the RF frequency plus a first integer multiple of the pulse repetition frequency.

17. A test system comprising:

a signal source that provides a pulsed signal characterized by an RF frequency and a pulse repetition rate to a device under test;

a filter bank that receives a measurement signal from the device under test and filters the measurement signal to provide a plurality of spectral components;

an accumulator that combines the spectral components into a combined signal; and an analyzer that analyzes the combined signal to determine a characteristic of the device under test;

wherein one of the plurality of spectral components corresponds with the RF frequency; and wherein the filter bank operates such that each of the plurality of spectral components corresponds to the RF frequency plus a different integer multiple of the pulse rate frequency.

18. The test system of claim 17 wherein each of the plurality of spectral components corresponds to a different frequency; and further including a tone shifter which shifts the different frequency for each of the spectral components by an amount necessary to bring each of the spectral components to a frequency which corresponds to the RF frequency, prior to the accumulator combining the different spectral components.

* * * * *

UNITED STATES PATENT AND TRADEMARK OFFICE
CERTIFICATE OF CORRECTION

PATENT NO. : 7,623,989 B2 Page 1 of 1
APPLICATION NO. : 11/238452
DATED : November 24, 2009
INVENTOR(S) : Loren C. Betts It is certified that error appears in the above-identified patent and that said Letters Patent is hereby corrected as shown below:

In column 9, line 3, in Claim 1, before "the" delete "it".

Signed and Sealed this

Twelfth Day of January, 2010

David J. Kappos
*Director of the United States Patent and Trademark Office*